July 5, 1966

RYUICHI MURAKAMI 3,259,695

MALFUNCTION MONITORING OF TIME-DIVISION MULTIPLEX PCM EQUIPMENT

Filed Oct. 15, 1962

3 Sheets-Sheet 1

Inventor
R. MURAKAMI
By Arthur M. Lederman
AGENT

July 5, 1966 RYUICHI MURAKAMI 3,259,695

MALFUNCTION MONITORING OF TIME-DIVISION MULTIPLEX PCM EQUIPMENT

Filed Oct. 15, 1962 3 Sheets-Sheet 2

Inventor
R. MURAKAMI
By [signature]
AGENT

July 5, 1966 RYUICHI MURAKAMI 3,259,695

MALFUNCTION MONITORING OF TIME-DIVISION MULTIPLEX PCM EQUIPMENT

Filed Oct. 15, 1962 3 Sheets-Sheet 3

Inventor
R. MURAKAMI
By [signature]
AGENT

United States Patent Office 3,259,695
Patented July 5, 1966

3,259,695

MALFUNCTION MONITORING OF TIME-DIVISION MULTIPLEX PCM EQUIPMENT

Ryuichi Murakami, Tokyo, Japan, assignor to Nippon Electric Company, Limited, Tokyo, Japan, a corporation of Japan Filed Oct. 15, 1962, Ser. No. 230,328
Claims priority, application Japan, Nov. 27, 1961, 36/43,013
5 Claims. (Cl. 179—15)

This invention relates to a system for monitoring the performance of time-division multiplex PCM transmission equipment and, more particularly, to a system which is able to monitor a malfunction in the performance of the compressor, coder, decoder, expander, and other equipment in the transmitter and receiver which lay in a common path for the information signals.

In conventional time-division multiplex transmission equipment, such as the widely used time-division multiplex PPM or PAM equipment, the monitoring has been relegated to either the frame synchronizing pulses, the channel selection signals, or alternating-current pilot signals sent from the transmitter through one of the channels to the receiver. The direct application of such monitoring systems to time-division multiplex PCM equipment will not suffice. In the former two a malfunction in the common path for the information signals, such as in the compressor, coder, decoder, or expander, which the frame synchronizing pulses and selection-signal transmission signals do not pass through, will not be detected. In the latter, a deterioration in the quality of channels caused by an excessive drift of the direct-current operating point of those portions that deal with analogue signals (e.g. the compressor, expander, and more particularly coder and decoder) will not be recognized.

Hence the object of this invention is to provide a monitoring system for time-division multiplex PCM transmission equipment which will detect any malfunction in the performance of the common path for information signals and which can monitor an excessive drift in the direct-current operating point of such portions in the common path that deal with analogue signals.

The invention is characterized by a direct-current pilot pulse generator, provided in the transmitter, for sending out direct-current pilot pulses through one of the channels; and a direct-current pilot pulse detector, provided in the receiver, which responds to level variations in the pilot pulses. With the invention, it is preferable to determine a common amplitude for the direct-current pilot pulses so that the channels may not be disturbed by the voltage which the pilot pulses would produce on such channels. By the concurrent use of the monitoring system of the invention and a conventional monitoring system which uses the frame synchronizing pulses or the channel selection signals, it is also possible to monitor the performance of circuits, which are not in the path for the information signals but rather are in the path for the frame synchronizing pulses or channel selection signals, and consequently to monitor any malfunction in the performance of a time-division multiplex PCM transmission equipment.

The above-mentioned and other features and objects of this invention and the manner of attaining them will become more apparent and the invention itself will be best understood by reference to the following description of embodiments of the invention taken in conjunction with the accompanying drawings in which:

FIG. 1 illustrates a conventional time-division multiplex PCM transmission equipment in which the circuitry of the invention is introduced.

FIGS. 2(*a*) and 2(*b*) illustrate wave forms at particular points in the transmission system of FIG. 1.

Figure 1:
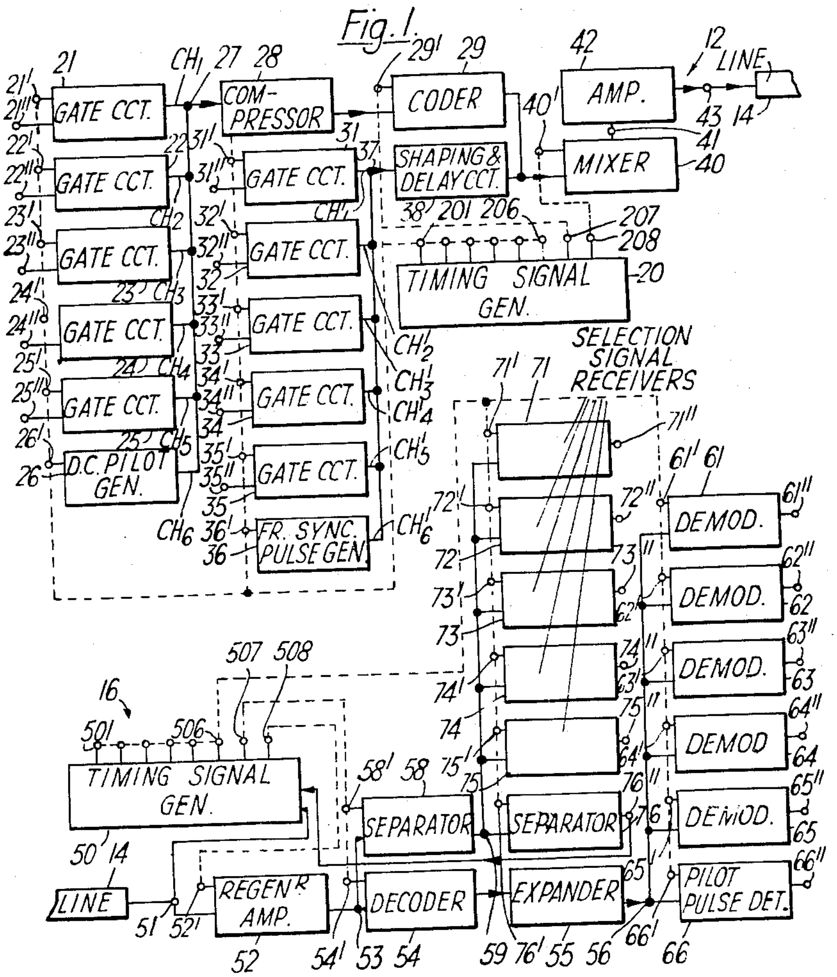

Referring to FIG. 1, the time-division multiplex PCM transmission equipment to which the system of this invention is applied comprises a transmitter 12, a wire or radio path 14, and a receiver 16. This equipment is of the conventional type, except for a direct-current pilot pulse generator and direct-current pilot pulse detector. It has six-channel capability, the sixth channel serving as a direct-current pilot pulse channel. The sampling frequency is 8 kc.; the levels of PCM quantization, for the information signals and direct-current pilot pulses, are $2^3=8$ (three bits); the levels of PCM quantization for the channel selection signals are $2^1=2$ (one bit); and the frame synchronizing pulses are formed by modulating the channel selection signal of the sixth, or direct-current pilot pulse channel, with 4 kc.

The transmitter 12 comprises a timing signal generator 20 applying at its output terminals 201–206 six-phase timing pulses of 8 kc.; at its output terminal 207 four-phase timing pulses of 48 kc.; and at its output terminal 208 single-phase timing pulses of 192 kc. At the channel gate circuits 21–25, which receive the 8 kc. timing pulses of the first to fifth phases at their timing input terminals 21'–25', information signals which are applied to receiving terminals 21''–25'' are gated to become the information pulse series of the first to fifth information signal channels CH1–CH5. A direct-current pilot pulse generator 26 which receives the 8 kc. timing pulses of the sixth phase obtained at the output terminal 206 of the timing signal generator 20, and which is to be later described in detail, generates a direct-current pilot pulse series whose repetition frequency is 8 kc., in the sixth information signal channel CH6. The parallel connection of these first to sixth information signal channels CH1–CH6 at point 27 makes it possible to obtain an amplitude-modulated pulse series which consists of pulses spaced at $(1/6)\times(1/8\times10^3)$ seconds or 125/6 microseconds. If the gate circuits 21–25 are balanced samplers (such as balanced pulse amplitude modulators) for producing in accordance with the zero, positive, and negative instantaneous values of the input information signals, zero, positive, and negative output pulses, respectively, and consequently a pulse series which has no direct-current components, the amplitude-modulated pulse series will be that shown in FIG. 2(*a*): or a pulse series consisting of pulses 2111, 2211, 2311, 2411, 2511, 2611, 2112, 2212, 2312, . . . . In the pulse series 27P of FIG. 2 pulses 2111, 2112, . . . , 2211, 2212, . . . , 2311, 2312, . . . , 2411, 2412, . . . , . . . , or 2611, 2612, . . . , of the respective information signal channels CH1, CH2, . . . , CH5, or CH6 appear every 125 microseconds, because of the sampling frequency of 8 kc. The polarities and amplitudes of the pulses in each of the first through fifth information signal channels (CH1–CH5) vary in accordance with the information to be transmitted through the channel concerned, while the pulses in the sixth information signal channel have a common polarity and amplitude. The amplitude-modulated pulse series is compressed at compressor 28 and then coded into an information and direct-current pilot signal PCM pulse series at a coder 29 which receives, at its timing pulse input terminal 29', the four-phase 48 kc. timing pulses obtained from the output terminal 207 of the timing signal generator 20. The information and direct-current pilot signal PCM pulse series is a three-bit PCM pulse series which lacks a pulse at each fourth bit position out of four bit positions spaced within a 125/6-microsecond interval by $(1/4)\times(1/48\times10^3)$ second or 125/24 microseconds. The three-bit PCM pulses are three-bit binary codes (000), (100), (010), (110), . . . which represent the respective levels of the quantization corresponding to the peak voltages of the compressed amplitude-modulated pulses. The relation between such peak voltages and binary codes will later be described with reference to FIG. 3.

The transmitter 12 further includes selection signal gate circuits, 31–35 which receive, at their timing pulse input terminals 31'–35', the first through fifth phase 8 kc. timing pulses, respectively, obtained at the output terminals 201–205 of the timing signal generator 20. The selection signal gate circuits 31–35 gate the selection signals, which are to be transmitted and which are supplied to the selection signal receiving terminals 31''–35'', into channel selection signals or a selection signal pulse series of from the first to fifth selection signal channels CH1'–CH5'. The selection signals are, for example, dial impulses for the selection in telephony by the calling party of the desired called party and must generally be transmitted in the time-division multiplex PCM transmission equipment after having been converted. In the selection signal pulse series, pulses having a repetition frequency of 8 kc. are either present or not present according to whether the selection signal receiving terminals 31''–35'' are grounded or left open. A frame synchronizing pulse generator 36 which receives at its timing pulse input terminal 36' the sixth-phase 8 kc. timing pulses obtained at the output terminal 206 of the timing signal generator 20, selects every other one of the sixth-phase 8 kc. timing pulses to produce a frame synchronizing pulse series having repetition frequency of 4 kc. The parallel connection of the first through sixth selection signal channels CH1'–CH6' at point 37 produces a selection signal and frame-synchronizing pulse series consisting of pulses spaced 125/6 microseconds. The selection signal and frame-synchronizing pulse series is shaped and delayed at a shaping and delaying circuit 38 so that the pulses will have substantially the same shape as those in the output of the coder 29 and are delayed by about $(125/6)\times(3/4)=125/8$ microseconds. The shaped and delayed selection signal and frame-synchronizing pulse series will be a one-bit PCM pulse series which has pulses approximately at the fourth bit positions of the information and direct-current pilot signal PCM pulse series. The information and direct-current pilot signal PCM pulse series and the selection signal and frame-synchronizing PCM pulse series are mixed at a mixer 40 which receives, at its timing pulse input terminals 40', the single-phase 192 kc. timing pulses and in which the two PCM pulse series are gated by the single-phase 192 kc. timing pulses, to become at point 41 a single PCM pulse series 41P (see FIG. 2(*b*)): the former series being disposed at the first through third bit positions while the latter series is precisely situated at the fourth bit positions. This PCM pulse series is composed of an information signal PCM pulse series Z, such as (111), (101), . . . (110), a selection signal PCM pulse series R (the two being arranged, in the positions described above, in the first through fifth channels CH1–CHV of the whole time-division multiplex PCM equipment), a direct-current pilot PCM pulse series P having a common pulse combination, such as (101), and a frame synchronizing signal PCM pulse series MK (the latter two being arranged at the first through third bit positions and at the fourth bit positions, respectively, of the sixth channel CHVI of the whole equipment). The PCM pulse series 41P is amplified by a transmitting amplifier 42 and then transmitted from terminal 43 to the line 14.

The constructional parts of the transmitter 12 except for the direct-current pilot pulse generator 26, selection signal channels CH1'–CH6', shaping and delaying circuit 38, and mixer 40 are described in the "Bell System Technical Journal," vol. 27, No. 1 (January 1948 issue), pp. 1–43 "An Experimental Multichannel Pulse Code Modulation System of Toll Quality" and so will not be explained here further. The direct-current pilot pulse generator 26 which is a gate circuit for gating direct-current with the timing pulses will be further described later. The frame synchronizing pulse generator 36 is a blocking oscillator operated by the timing pulses. The mixer 40 is two-input AND gates which respond to the PCM pulse series and the timing pulse.

The receiver 16 comprises a timing signal generator 50 which is set into operation, in a manner to be later explained, by the PCM pulse series received via the line 14. The generator 50 applies at its output terminals 501–506, 507, and 508 six-phase 8 kc., four-phase 48 kc., and single-phase 192 kc. timing pulses, respectively, so that their phase relations may be identical with those of the corresponding timing pulses of the generator 20 on the transmitter side. The PCM pulse series which reaches input terminal 51 has generally been attenuated and deformed during its passage through the line 14. The PCM pulse series is therefore amplified and shaped at pulse regenerator-amplifier 52, which receives the single-phase 192 kc. timing pulses at terminal 52'. The series emerges at point 53 in the same form as it had at point 41 (see FIG. 2(*b*)). This PCM pulse series is now applied to a decoder 54, which receives at its timing pulse input terminal 54' the four-phase 58 kc. timing pulses, so that the selection signal PCM pulses R and the frame synchronizing signal PCM pulses MK in the fourth bit positions may be suppressed, while the information signal PCM pulse Z and direct-current pilot PCM pulse P in the first through third bit positions may be decoded. The output of the decoder 54 is an amplitude-modulated pulse series composed of rectangular pulses whose peak voltages correspond to the levels of quantization represented in the binary codes by the three-bit information and direct-current-pilot signal PCM pulse series. The amplitude-modulated pulse series is expanded at expander 55 to become, at point 56 on the output side thereof, another amplitude-modulated pulse series 56P which has the same pulse intervals and proportional pulse amplitude as the amplitude-modulated pulse series 27P shown in FIG. 2(*a*).

The PCM pulse series 53P which is obtained at the point 53 is also applied to a selection signal and frame synchronizing pulse separator 58, which receives at its timing pulse input terminal 58' the four-phase 48 kc. timing pulses so that the information signal PCM pulse series Z and direct-current pilot PCM pulse series P, which are in the first through third bit positions, may be suppressed, and the selection signal pulses and frame synchronizing signal pulses, which are in the fourth bit positions, obtained.

The amplitude-modulated pulse series 56P is now simultaneously applied to channel demodulators 61–65. These demodulators receive, at their timing pulse input terminals 61'–65' the first through fifth phase timing pulses, of the six-phase 8 kc. timing pulses obtained at the output terminals 501–506, so that the information pulse series of the respective channels may be selected, demodulated, and the demodulated information available at output terminals 61''–65''. The same amplitude-modulated pulse series 56P is applied to a direct-current pilot pulse detector 66 which receives, at terminal 66', the sixth phase 8 kc. timing pulses so that the direct-current pilot pulses may be selected by the timing pulses and tested for the common level thereof. If this level is not normal, being either greater or smaller, an alarm signal is derived at output terminal 66″ (how this is done will be explained later). The alarm signal may be used to give warning to the maintenance personnel by driving a warning signal circuit, not shown, connected to the alarm output terminal 66″.

The selection signal and frame synchronizing pulses obtained in the receiver 16 at the point 59 are applied to selection signal receivers 71–75, which receive, at input terminals 71′–75′, the first through fifth phase 8 kc. timing pulses, so that the selection signals of the respective channels may be selected, demodulated, and derived at output terminals 71″–75″. The same selection signal pulses and frame synchronizing pulses are also applied to a frame synchronizing pulse separator 76, which receives at its timing pulse input terminal 76′ the sixth phase 8 kc. timing pulses so that pulses, if any, at the time positions of the frame synchronizing pulse may be selected by the timing pulses, and tested for conformity to the true frame synchronizing pulses. Should an error be detected shift pulses are derived at shift pulse output terminal 76″ for shifting the timing signal generator 50.

The combination of the timing signal generator 50 and frame synchronizing pulse separator 76 serve to generate (from the PCM pulse series which has arrived at the input) an electrical oscillation of 192 kc. which is the fundamental frequency of the PCM pulse series, producing therefrom the various timing pulses; and to monitor the coincidence of the sixth phase 8 kc. timing pulses, obtained at the timing signal generator 50, with those occupied by the frame synchronizing pulses MK in the PCM pulse series 53P, obtained at the point 53 on the output side of the pulse regeneator-amplifier 52. If synchronization is lacking or is lost the phases of the timing pulses, such as the six-phase 8 kc. timing pulses, are shifted by shift pulses which are produced at the shift pulse output terminal 76′ of the frame synchronizing pulse separator 76. This operation is similar to that described in "Bell Laboratories Record," February 1949 issue, pp. 62–66, "Synchronization for the PCM Receiver." The pulse regenerator-amplifier 52, decoder 54, expander 55, and channel demodulator 61–65 which are described in the above-referred to "Bell System Technical Journal," are well known and will not be described in detail.

In the time-division multiplex PCM transmission equipment of FIG. 1 it may be seen that the compressor 28, coder 29, decoder 54, and expander 55 are all common to the information signal channels. In one of the conventional monitoring systems described previously the time-division multiplex PCM transmission equipment similar to the equipment of FIG. 1 comprises no direct-current pilot pulse generator 26 or direct-current pilot pulse detector 66, but comprises instead a monitoring circuit in the receiver for the received outputs of the selection signals or frame synchronizing pulses in order to test the selection-signal transmission signals, or frame synchronizing pulses, for errors. With this system, it is impossible to monitor a malfunction which has occurred somewhere in the above-mentioned common path since the selection-signal transmission signals and frame synchronizing pulses do not pass therethrough. Where an alternating-current pilot signal generator and an alternating-current pilot signal detector (mentioned previously in connection with PAM and PPM equipment) are utilized to monitor performance, not only is the construction of the alternating-current pilot signal generator more complicated than the direct-current pilot pulse generator, but also it is impossible, as will later be described in detail, to monitor an excessive drift in the direct-current operating point of parts such as the coder, decoder, expander and compressor, which deal with the analogue signals, and to monitor the consequent deterioration in the channel quality and more particularly the nonlinear distortion characteristic. In contrast, the monitoring system of the invention can monitor not only any faults which have occurred in the common path for the information signals and selection-signal transmission signals, such as the mixer 40, transmitting amplifier 42, timing signal generator 20 on the transmitter side, line 14, pulse regenerator-amplifier 52, timing signal generator 50 on the receiver side, and others; but also any faults which have occurred in any portion of the common path, because monitoring is attained by use of direct-current pilot pulses which pass through such a path. Inasmuch as a time-division multiplex PCM transmission equipment can generally transmit direct-current levels, the construction of the transmission equipment is not complicated. The monitoring system of the invention can therefore monitor, if used together with a conventional monitoring system, employing the selection signals or frame synchronizing pulses, almost all possible malfunctions in the performance of time-division multiplex PCM transmission equipment.

Figures 2A, 2B, 3, 4:
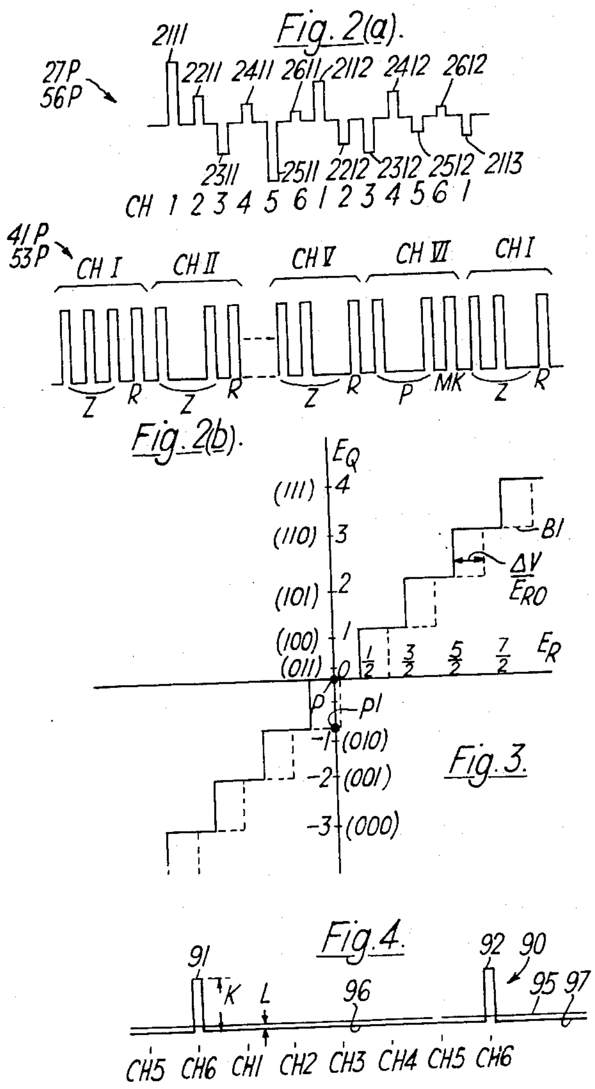
FIG. 3 shows the quantization characteristic of a coder used in the transmitter of conventional time-division multiplex PCM transmission equipment.
FIG. 4 illustrates graphically the method for determining the preferable amplitude of the direct-current pilot pulses.

Referring now to FIG. 3 the monitoring of excessive drift in the direct-current operating point of the coder, decoder, and others will now be discussed.

Inasmuch as the construction of a general coder for coding sampled information, such as the PAM pulse series shown in FIG. 2(*a*), can be found in "Proceedings of the IRE," August 1953 issue, pp. 1053–1058, "Coding by Feedback Methods," only the quantization characteristic thereof which relates to the monitoring of the excessive drift of the direct-current operating point will be explained with reference to FIG. 3. The quantization characteristic may be illustrated by a step-like solid line in FIG. 3, in which the abscissa represents the relative peak voltages $E_R$ of the input amplitude-modulated pulses (as measured in terms of a unit voltage $E_{RO}$) while the ordinate represents relative quantized voltages $E_Q$ (as measured in terms of a unit voltage $E_{QO}$) as well as the output binary codes corresponding to the quantized voltages. In such a coder, the input amplitude-modulated pulse whose relative peak voltage is between 1/2 and 1/2, for example, will produce a relative quantized voltage of zero and an output binary code of (011), if the operation of the coder is normal. The quantization characteristic will vary, however, due to changes in the power source voltage, the ambient temperature, aging and the like. Since a change in the voltage of the direct-current operating points by $\Delta V$ is equivalent to a uniform change in the relative peak voltages of the input amplitude-modulated pulses by $\Delta V/E_{RO}$, the quantization characteristic will shift, upon the occurrence of such change, to the characteristic curve shown by the dotted-line (this is obtained by a parallel displacement of the solid-line characteristic curve, along the abscissas, by $\Delta V/E_{RO}$). It follows, therefore, that if the absolute value $\Delta V$ of the variation-$\Delta V$ of the direct-current operating point is smaller than the unit voltage $E_{RO}$ for the peak voltage of the input amplitude-modulated pulses, the relative quantized voltage corresponding to a zero relative peak voltage will change from a value given by the intersection P of straight line $E_R=0$ and the normal characteristic curve, to another intersection P′ of the same straight line and the shifted characteristic curve, with the result that the output binary code changes from (011) to (010). The normal dynamic characteristic of the decoder can be illustrated by the solid-line characteristic curve if the ordinate and abscissa of FIG. 3 are considered the input binary codes and relative peak voltages of the output amplitude-modulated pulses, respectively. If the coder undergoes the above-mentioned change while the decoder remains normal, the relative peak voltage of output amplitude-modulated pulse of the decoder will change, in the above-mentioned example, from 0 to −1: an error in the time-division multiplex PCM transmission equipment including such a coder and decoder. If the absolute value $\Delta V$ of the variation $\Delta V$ of the direct-current operating point of the coder is greater than the unit voltage $E_{RO}$ of the peak value of the amplitude-modulated pulses and if N is a positive number satisfying $$\Delta V - E_{RO}/2 \leqq N E_{RO} < \Delta V + E_{RO}/2 \qquad (1)$$

the relative peak voltage of the output amplitude-modulated pulse of the decoder changes from O to N in the above-cited example. If the change ΔV of the direct-current operating point is in the negative sense, N is a negative number. If the absolute value of the voltage ΔV is sufficiently greater than the unit voltage $E_{RO}$, it follows that $$\Delta V \approx NE_{RO}$$

and that the actual peak voltage of the output amplitude-modulated pulse of the decoder changes from O to ΔV in the example thus far considered. It is to be noted here that if the variation in voltage of the direct-current operating point of the coder is ΔV, and if the dynamic characteristic of the decoder does not vary, N which may be either a positive or negative integer is given by the Equation 1. It is possible, therefore, to consider that the variation $NE_{RO}$ of the peak voltage of the decoded amplitude-modulated pulses is equal to ΔV. If the quantization characteristic of the coder does not vary but the direct-current operating point of the decoder varies, the output peak voltage of the amplitude-modulated pulses varies in the same manner. If now the sum of the variations in the direct-current operating points of the coder and decoder is ΔV, and if the envelope voltage of the amplitude-modulated pulses of a certain channel applied to the coder is $v_1$, and if the envelope voltage of the amplitude-modulated pulses obtained from the decoder for the particular channel is $v_0$, it follows that $$v_0 = v_1 + \Delta V \qquad (2)$$

In time-division multiplex PCM transmission equipment, the compressor and expander are of generally logarithmic characteristics, which may be given (as described in "Bell System Technical Journal," vol. 36, No. 3 (March 1957 issue), Equations 8(*a*) and 8(*b*) on page 667, by interchanging the independent and dependent variables) by $$v_1 = \pm V \ln\,(1 + |\mu e_1/V|)/\ln(1+\mu) \qquad (3)$$

and $$e_0 = \pm V[\exp(|v_0/V|\ln[1+\mu]) - 1]/\mu \qquad (4)$$

respectively, where $v_1$ denotes the output voltage of the compressor which is the input of the coder, $e_1$ denotes the input voltage of the compressor, $v_0$ denotes the input voltage of the expander which is the output of the decoder, $e_0$ denotes the output voltage of the expander, ln denotes a natural logarithmic function, exp denotes an exponential function to the base *e* of the natural logarithm, V denotes the maximum transmission level, and $\mu$ denotes a constant for the degree of the compression or expansion.

If the input voltage of the compressor is a series of direct-current pilot pulses whose amplitude is $+e_p$ and if the drift of the direct-current operating point throughout the coder through decoder is +ΔV, it follows from consideration of Equation 1, that $$v_1 = V \ln\,(1+\mu e_p/V)/\ln(1+\mu) \qquad (5)$$

and $$e_0 = V[\exp([v_1+\Delta V]/V \cdot \ln[1+\mu]) - 1]/\mu$$

or $$e_0 = V[\exp([\Delta V/V]\ln[1+\mu]) \cdot (1+\mu e_p/V) - 1]/\mu \qquad (6)$$

as regards the channel for the direct-current pilot pulses. If the argument of the exponential function in Equation 6 is sufficiently smaller than unity, Equation 6 may be expressed as $$e_0 \approx V[(1+[\Delta V/V \ln[1+\mu])(1+\mu e_p/V) - 1]/\mu$$

or $$e_0 \approx e_p(1+[\Delta V/V]\ln[1+\mu]) + (\Delta V/\mu)\ln(1+\mu) \qquad (6')$$

when only the first two terms of the series defining the exponential function are considered. If $\mu$ is 100 (it is generally from 100 to 1000 as described in Equation 38 on page 687 of the above-referred Bell System Technical Journal, March 1957 issue) it follows that $$e_0 \approx e_p(1+4.6\Delta V/V) \qquad (6'')$$

from Equation 6′ where the second term is negligible. In conclusion, it follows that if the input voltage of the compressor is a series of direct-current pilot pulses whose amplitude is $+e_p$; if the drift of the direct-current operating point throughout the coder through decoder is $+\Delta V$; if $\mu$ is 100; and if $\Delta V/V$ is 0.03, the level variation of the direct-current pilot pulses in the output $e_0$ of the expander is 1.2 db as calculated by use of Equation 6″ and can easily be detected by a direct-current pilot pulse detector. Similarly, variations in the quantization levels of the coder and decoder and level variations of the compressor can also be detected with ease by the direct-current pilot pulse detector.

If on the other hand, the input voltage of the compressor was an alternating-current pilot signal, obtained by sampling a sinusoidal electric oscillation of A sin *pt*, and if the drift of the direct-current operating point throughout the coder through the decoder is +ΔV, it follows that $$v_1 = \pm V \ln\,(1+|\mu A.\sin pt/V|)/\ln(1+\mu) \qquad (7)$$

and $$e_c = \pm V[\exp(|[v_1+\Delta V]/V|\ln[1+\mu]) - 1]/\mu \qquad (8)$$

as regards the channel for the alternating-current pilot signal. Substituting in Equation 8

$$e_0 = V[(1+\mu)^{\Delta V/V}(1+\mu A.\sin pt/V) - 1]/\mu$$

when sin *pt* is not negative and accordingly when $v_i$ is not negative; and $$e_0 = V[(1+\mu)^{\Delta V/V}(1-\mu A.\sin pt/V)^{-1} - 1]/\mu \qquad (8b)$$

when sin *pt* is not positive and accordingly when $v_1$ is not positive and if $v_1$ is not smaller than $-\Delta V$; and $$e_0 = V[1-(1+\mu)^{-\Delta V/V}(1-\mu A.\sin pt/V)]/\mu \qquad (8c)$$

when sin *pt* is not positive and if $v_1$ is not greater than −ΔV.

The values of $e_0$ can be given by the following Fourier series, since the values of $e_0$ given by Equations 8*a–c* represent a distorted alternating-current voltage whose fundamental angular frequency is *p*, which is the angular frequency of the sinusoidal electric oscillation A sin *pt*:

$$e_0 = \sum_{n=0}^{\infty} a_n \cos npt + \sum_{n=1}^{\infty} bn \sin npt \qquad (8')$$

The coefficients $a_n$ and $b_n$ that will make Equation 8′ equivalent to the Equations 8*a*, 8*b*, and 8*c* for the respective ranges of sin *pt*, are (by calculation):

$$\left.\begin{array}{ll} a_0 \doteqdot (0.05V+2.9A)\Delta V/V, & a_1=0, \\ a^2 \doteqdot -2.1A\Delta V/V & a_3=0, \\ \cdots & \\ b_1 \doteqdot [1+11(\Delta V/V)^2]A & b_2=0, \\ b_3 \doteqdot -0.04(\Delta V/V)^2 V & \cdots \end{array}\right\} (8'')$$

for these ranges $$1 \geqq A/V > 0.01,\ \Delta V/V < 0.05$$

if $\mu$ is 100. In conclusion, it follows that if the compressor is supplied with an alternating current pilot signal obtained by sampling the sinusoidal electrical oscillation *A* sin *pt*; if the drift of the direct-current operating point throughout the coder and decoder is $+\Delta V$; if $\mu$ is 100; if $A/V$ is not greater than unity but is greater than 0.01; and and if $\Delta V/V$ is 0.03, the level variation F of the alternating-current pilot signal $e_0$ in the output of expander is $$F = 20\log_{10}([A/\sqrt{2}]/[\sqrt{a_1^2+b_1^2}/\sqrt{2}])$$

$$\doteqdot -20\log_{10}(1+11[\Delta V/V]^2) \doteqdot -0.1 \text{ db}$$

as calculated from Equations 8″. Inasmuch as it is very difficult to obtain an alternating-current pilot signal detector for detecting a level of this order, would obviously be extremely impractical to monitor the variation of direct-current operating point of the coder and decoder by this method.

If the compressor is supplied with an information signal which consists of components having the form of $A \sin pt$, the input voltage of the compressor can be considered a signal obtained by sampling a sinusoidal electrical oscillation $A \sin pt$. Now, if the drift of the direct-current operating point throughout the coder through decoder is $+\Delta V$; if $\mu$ is 100; if $A/V$ is not greater than unity but is greater than 0.01; and $\Delta V/V$ is 0.03, then the second-order distortion attenuation D of the output $e_0$ of the channel of the particular information (or the ratio of the effective value of the fundamental wave component of the output $e_0$ in question, to the effective value of the second-order harmonic component) is $$D=20\log_{10}([\sqrt{a_1^2+b_1^2}/\sqrt{2}]/[\sqrt{a_2^2+b_2^2}/\sqrt{2}])$$
$$\doteqdot 20\log_{10}|(1+11[\Delta V/V]^2)A/(-2.1A\Delta V/V)\doteqdot 24 \text{ db}$$

as calculated by Equations 8″. This means that even if the ratio of the drift of the direct-current operating point to the maximum transmission level is only three percent throughout the coder through decoder, the second-order distortion attenuation in the output of the expander is small and consequently the information signals are considerably distorted. Inasmuch as it is generally difficult to maintain a low ratio of the direct-current operating point drift to the maximum transmission level for a long period of time, it is very important to discover an incurred drift; and, this may now be done with the monitoring system of the invention.

In time-division multiplex PCM transmission equipment such as shown in FIG. 1, the compressor and expander also serve to lessen the quantization noise. In order to strengthen this function of the compressor and expander, it is necessary to keep the background or disturbing voltage (which appears at the pulse positions that the amplitude-modulated pulse series of the channel would occupy when there is no information signal) small. This voltage results from an unbalancing of the modulators (where balanced pulse amplitude modulators are used); from hum noise originating in the power source; from leakage current through blocking capacitors contained in the compressor and expander, and other sources. The most serious cause of the distributing voltage is the unbalanced pulse output voltage. A description of this source may be found in the above-cited Bell System Technical Journal, March 1957 issue, page 653. It is to be noted that inasmuch as the compressor, expander, and other circuits comprise capacitors, a distributing voltage also originates with the monitoring system of the invention (from the direct-current pilot pulses) and it is preferable to ascertain an amplitude for the direct-current pilot pulses so that the distributing voltage produced by such pulses may be lower than a predetermined value. Referring now to FIG. 4, in which the abscissa is the time axis while the ordinate represents the voltages of amplitude-modulated pulses, an amplitude-modulated pulse series is shown which has no pulses in channels CH1–CH5 but has direct-current pilot pulses 91, 92 . . . having a common pulse height K in the direct-current pilot pulse channel CH6. Since these direct-current pilot pulses are blocked by a blocking capacitor, the area above the straight line 95 representing the zero level and the area below such a line become equal to each other, and the resulting distributing voltage —L is given by $$L\times 1\doteqdot K\times d \qquad (9)$$

where L is the depth of inter-pulse portions 96, 97 . . . as measured from the zero level straight line 95 and $d$, which is assumed to be small, is the duty factor of the direct-current pilot pulse. In other words, the use of direct-current pilot pulses introduces, where there is no information signal in a certain channel, a biasing voltage of —L to the pulse positions the pulses of the particular channel would occupy. It is known (see the above cited Bell System Technical Journal, March 1957 issue at page 653) that such a distributing voltage is not material if it is of the order of $\frac{1}{500}$–$\frac{1}{1,000}$ of the maximum transmission level. It is also preferable in the widely used time-division multiplex PCM transmission equipment of twenty-four channels for the duty factor $d$ of the direct-curent pilot pulse series to be of the order of $\frac{1}{60}$. It is therefore possible with the monitoring system of the invention to attain the most preferable result when the height K of the direct-current pilot pulses is set at $\frac{1}{10}$–$\frac{1}{20}$ of the maximum transmission level.

Figure 5:
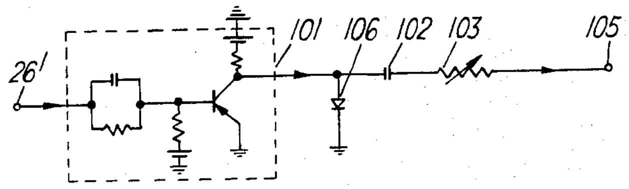
FIG. 5 shows the direct-current pilot pulse generator used in the transmitter of FIG. 1.

Turning to FIG. 5, a direct-current pilot pulse generator is shown for use in the transmitter 12 of FIG. 1. It comprises a saturated pulse shaper-amplifier 101 (see "Handbook of Semiconductor Electronics," McGraw-Hill, pp. 15–30) which has a timing pulse input terminal 26′ for receiving timing pulses having a repetition frequency of 8 kc. supplied from the output terminal 206 of the timing signal generator 20. The saturated pulse shaper-amplifier 101 produces a positive rectangular pulse at its output upon the reception of a negative pulse at its timing pulse input terminal 26′. The 8 kc. positive rectangular pulses thus obtained, are applied via a blocking and coupling capacitor 102 and a level adjusting variable resistor 103 to output terminal 105. A zener diode 106 is disposed between ground and the output of the saturated pulse shaper-amplifier 101, in order to stabilize the level of the pilot pulses. When the time-divided channels are large in number and accordingly the width of the direct-current pilot pulses must be narrow this zener diode is preferably of the gold-bonded type, which has small interelectrode capacity.

Figure 6:
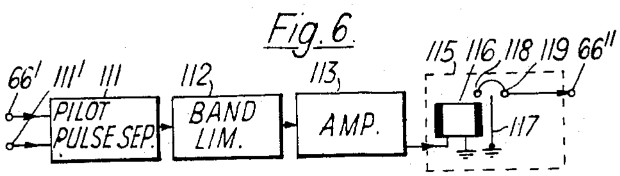
FIG. 6 illustrates the direct-current pilot pulse detector used in the receiver of FIG. 1.

In FIG. 6 may be seen a direct-current pilot pulse detector for use in the receiver 16 of FIG. 1. It comprises a direct-current pilot pulse separator 111 which has a timing pulse input terminal 66′ for receiving the 8 kc. timing pulses supplied from the output terminal 506 of the timing signal generator 50, and a signal input terminal 111′ for receiving the amplitude-modulated pulse series 56P (which contains the information signal and direct-current pilot pulses) obtained at point 56 on the output side of the expander 55. The direct-current pilot pulse separator 111 gates the direct-current pilot pulses out of the amplitude-modulated pulse series 56P and may either be a gate circuit or the balanced pulse amplitude modulator explained in detail in the above-cited Bell System Technical Journal, January 1948 issue, at page 27. In the band limiter 112 (a direct-current and low pass filter or a band-pass filter having center frequency of 8 kc.) either the direct-current component or the component whose frequency is 8 kc. is derived from the direct-current pilot pulses. This component is amplified at amplifier 113 and then flows through the winding 116 of a relay in the detection circuit 115. The movable contact 117 of this relay is urged in contact with either of fixed contacts 118 and 119 thus grounding output terminal 66″ when the output of the amplifier 113 is greater or smaller than predetermined upper and lower limits. Thus, the direct-current pilot pulse detector 66 can send out a warning signal at the output terminal 66″ when a variation occurs in the level of the direct-current pilot pulses which have reached the receiver 16. If the level of the direct-current pilot pulses supplied to the signal input terminal 111′ of the direct-current pilot pulse detector 66 is sufficiently large, the amplifier 113 can be dispensed with. Where the detection circuit 115 is very sensitive to the input level, as it would be in the case of a meter relay, it is possible to monitor a very small level variation of the direct-current pilot pulses. Also if the detector 115 is operable at high speed, as is the case with a reed relay or a semiconductor relay, it is possible to monitor a very rapid level variation of the direct-current pilot pulses.

In the embodiment and modifications so far described, one of the channels of the time-division multiplex PCM transmission equipment has been used as the direct-current pilot pulse channel. It is possible, however, to transmit the direct-current pilot pulses through a service channel, for making maintenance arrangements of the transmission equipment, since this channel is not busy as often and since while the service call is underway the maintenance personnel are generally monitoring the performance of the transmission equipment anyway. Under such circumstances, the direct-current pilot pulse generator 26 and detector 66 shown in FIG. 1 may be replaceed with a service call transmitter-direct current pilot pulse generator and a service call receiver-direct current pilot pulse detector to be explained with reference to FIGS. 7 and 8. The transmission of the direct-current pilot pulses through the service channel makes it possible to decrease the number of channels and thus reduce the band-width of the equipment.

Figure 7:
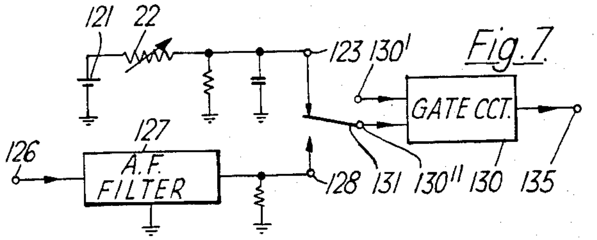
FIGS. 7 and 8 show modifications of the circuits shown in FIGS. 5 and 6, for employment with the maintenance service channel.

Referring to FIG. 7, the service call transmitter-direct current pilot pulse generator shown therein is so arranged that a direct-current voltage is available from a stable direct-current voltage source 121, illustrated as a battery, through a variable resistor 122 for adjusting the level of the direct-current pilot pulses, at an output terminal 123. On the other hand, a service signal supplied to a service signal input terminal 126 is led through an audio-frequency band-pass filter 127 to a service signal supplying terminal 128. The direct-current voltage and the service signal are supplied through a manually operable switch 131 for interswitching the direct-current voltage output terminal 123 and service signal supplying terminal 128, to a signal input terminal 130'' of a gate circuit or balanced pulse amplitude modulator 130 having a timing pulse input terminal 130' for receiving the timing pulses of the corresponding phase from the timing signal generator 20 on the transmitter side. Thus, the service call transmitter-direct current pilot pulse generator can apply at an output terminal 135 either the supplied service signal or the direct-current pilot pulses in accordance with the selection made by the maintenance personnel at the switch 131.

Figure 8:
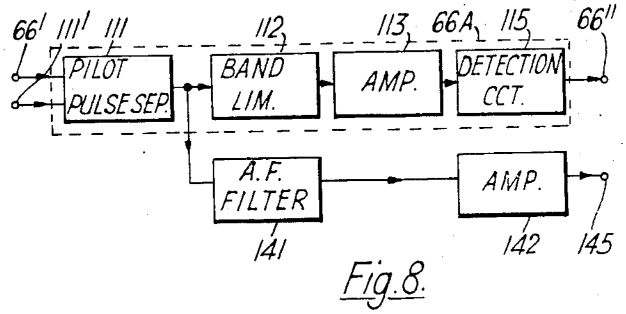

Finally referring to FIG. 8, a service call receiver-direct current pilot pulse detector shown therein comprises a direct-current pilot pulse detector portion 66A which is composed similiarly to the direct-current pilot pulse detector of FIG. 6. The output of the direct-current pilot pulse separator 111 is not only sent to the band limiter 112 but is also sent through an audio-frequency band-pass filter 141 to a service channel audio amplifier 142. The received sampled order signal does not pass through the band limiter 112, which is either a direct-current and low-pass filter or a band-pass filter whose center frequency is the sampling frequency, but goes through the band-pass filter 141 to be demodulated thereat and through the audio amplifier 142 to an output terminal 145. The received direct-current pilot pulses on the other hand do not pass through the band-pass filter 141 but go through the band limiter 112 to the detection circuit 115. Calling up by maintenance personnel can be done by the initiating party by intermittently sending out the direct-current pilot pulses to the called party in a predetermined manner (coded ringing). The other party can similarly send out direct-current pilot pulses by employing the transmitter located on the side of the called party. Calls and replies can thus be interchanged, since the warning signals would in all probability never be so regularly intermittent should a malfunction occur.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. In a time division multiplex PCM transmission system which includes a transmitter for transmitting a PCM pulse train which has been formed by sampling and coding the output signals from a plurality of channels in said transmitter, and a receiver for receiving and decoding the transmitted PCM pulse train and then distributing the decoded pulse train to a plurality of channels in said receiver, a monitoring system for monitoring the operation of said transmission system as data is being processed therein, said monitoring system comprising:

(A) means in said transmitter for generating uniformly spaced pilot pulses which have the same predetermined width, polarity and amplitude;

(B) amplitude-modulating means in said transmitter, including means for inserting said pilot pulses at predetermined positions, into the sampled information signals to form an amplitude modulated pulse train which includes said pilot signals;

(C) means in said transmitter for coding said amplitude modulated pulse train, including said pilot pulses, into the time division multiplex PCM pulse train which is to be transmitted;

(D) decoding means in said receiver for decoding the received PCM pulse train to produce a replica of said amplitude-modulated pulse train, which replica includes said inserted pilot signals;

(E) and detection means in said receiver responsive only to the pilot signals contained in said replica pulse train, for determining whether said pilot pulses have been distorted beyond preselected limits thereby indicating whether a malfunction, including undesired drift in direct current working points, has occurred in the transmission system.

2. A time division multiplex ssytem comprising:

(A) an input information signal source;

(B) a transmitter having:

(1) a number of information processing channels connected to receive signals from said input source, (2) an additional channel including means for generating pilot pulses which are uniformly spaced from each other and which have the same polarity, amplitude and width, (3) amplitude modulating means connective to all said channels including means for cyclically sampling the output signals from said channels for forming an amplitude modulated pulse train which includes said pilot signals, (4) coding means connected to receive and code said amplitude modulated pulse train into a time division multiplex PCM pulse train, (5) and means for transmitting said time division multiplex PCM pulse train;

(C) a receiver for receiving the thus transmitted time division multiplex PCM pulse train, said receiver including:

(1) decoding means for decoding the received PCM pulse train to produce a repliaca of said amplitude modulated pulse train which includes said pilot pulses, (2) a plurality of channels equal in number to the number of information processing channels in said transmitter and an additional receiver channel, (3) amplitude demodulating means, for demodulating said replica pulse train, said demodulating means including means for distributing said demodulated pulses to said channels such that the pilot pulses are all distributed to said additional receiver channel, (4) and detection means in said additional receiver channel, responsive to said distributed pilot pulses for determining whether said pilot signals have been distorted beyond preselected limits thereby indicating whether malfunctions, including shifts in direct current working points, have occurred in the system.

3. A time division multiplex PCM system as set forth in claim 2 wherein said detection means in said additional receiver channel includes means for discriminating the received pilot signals with reference to a predetermined potential corresponding to the amplitude of the pilot pulses generated in said transmitter.

4. A time division multiplex PCM system as set forth in claim 3 wherein alarm means are provided and connected to be actuated whenever said detection means indicates that the pilot pulses have been distributed beyond said predetermined limits.

5. In a method for monitoring the operation of a time division multiplex PCM system in which information signals are processed in a plurality of transmitter channels which generate output signals that are then sampled and formed into an amplitude modulated pulse train which is thereafter coded into a time division multiplex PCM pulse train and transmitted to a receiver which decodes said PCM pulse train into a replica of said amplitude modulated pulse train, demodulates said replica pulse train and then distributes the demodulated pulses to a plurality of channels in the receiver which further processes said distributed pulses, the steps comprising: generating pilot pulses in an additional channel in said transmitter which are uniformly spaced from each other and which have the same amplitude, polarity and pulse width; inserting said pilot signals into preselected positions in said amplitude modulated pulse train such that said pilot pulses will be coded and transmitted along with the information containing pulses of said amplitude modulated pulse train; decoding the received pulse train to form a replica of said amplitude modulated pulse train which includes said pilot pulses; demodulating said replica pulse train, including said inserted pilot pulses; distributing the demodulated pilot pulses to an additional channel in said receiver; and then comparing the amplitude of the thus distributed pilot pulses with the known preselected amplitude of the transmitted pilot pulses to ascertain whether malfunctions, including undesired shifts in direct current operating points, have occurred in said transmission system.

References Cited by the Examiner

UNITED STATES PATENTS

| | | | |
|---|---|---|---|
| 2,744,959 | 5/1956 | Greefkes et al. | 179—15 |
| 3,057,972 | 10/1962 | Mann | 179—15 |
| 3,083,267 | 3/1963 | Weller | 179—15 |
| 3,087,144 | 4/1963 | Bianchi et al. | 179—15 |

DAVID G. REDINBAUGH, *Primary Examiner.*

T. G. KEOUGH, R. L. GRIFFIN, *Assistant Examiners.*